United States Patent
Yamagishi

(10) Patent No.: US 12,107,278 B2
(45) Date of Patent: *Oct. 1, 2024

(54) SOLID OXIDE FUEL CELL AND MANUFACTURING METHOD OF THE SAME

(71) Applicant: TAIYO YUDEN CO., LTD., Tokyo (JP)

(72) Inventor: Shinichi Yamagishi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,632

(22) Filed: Feb. 4, 2021

(65) Prior Publication Data

US 2021/0288332 A1    Sep. 16, 2021

(30) Foreign Application Priority Data

Mar. 10, 2020   (JP) .................................. 2020-040846

(51) Int. Cl.
| | | |
|---|---|---|
| *H01M 4/90* | (2006.01) | |
| *H01M 4/86* | (2006.01) | |
| *H01M 8/12* | (2016.01) | |

(52) U.S. Cl.
CPC ....... *H01M 4/9025* (2013.01); *H01M 4/8621* (2013.01); *H01M 4/8673* (2013.01); *H01M 2008/1293* (2013.01)

(58) Field of Classification Search
CPC ............. H01M 4/9025; H01M 4/8621; H01M 4/8673; H01M 2008/1293; H01M 4/8846;
(Continued)

(56) References Cited

U.S. PATENT DOCUMENTS

| | | | |
|---|---|---|---|
| 4,767,680 A | | 8/1988 | Hijikata .......................... 429/456 |
| 5,670,270 A | * | 9/1997 | Wallin ................ H01M 8/1213 |
| | | | 429/496 |

(Continued)

FOREIGN PATENT DOCUMENTS

| | | |
|---|---|---|
| CN | 1897337 A | 1/2007 |
| CN | 103765647 A | 4/2014 |

(Continued)

OTHER PUBLICATIONS

Peter Blennow et al., "Development of Planar Metal Supported SOFC with Novel Cermet Anode", ECS Transactions, 25 (2) 701-710 (2009).

(Continued)

*Primary Examiner* — Helen Oi K Conley
(74) *Attorney, Agent, or Firm* — Stein IP LLC

(57) ABSTRACT

A solid oxide fuel cell includes an anode that includes a porous layer including an electron conductive ceramics and an oxygen ion conductive ceramics, the porous layer of the anode being impregnated with an anode catalyst, an electrolyte layer that is provided on the anode and includes a solid oxide having oxygen ion conductivity, and a cathode that is provided on the electrolyte layer and has a porous layer including an electron conductive ceramics and an oxygen ion conductive ceramics, the porous layer of the cathode being impregnated with a cathode catalyst.

8 Claims, 4 Drawing Sheets

(58) Field of Classification Search
CPC .... H01M 4/8882; H01M 8/10; H01M 4/8657; H01M 4/8885; Y02E 60/50; Y02P 70/50
See application file for complete search history.

(56) References Cited

U.S. PATENT DOCUMENTS

| | | | |
|---|---|---|---|
| 6,146,780 A | 11/2000 | Cisar | 429/435 |
| 2002/0048699 A1 | 4/2002 | Steele et al. | 429/30 |
| 2004/0043272 A1 | 3/2004 | Gorte | 429/488 |
| 2004/0247978 A1 | 12/2004 | Shimamune | 428/685 |
| 2005/0019642 A1 | 1/2005 | Hishitani | 429/465 |
| 2005/0266297 A1 | 12/2005 | Irvine et al. | 429/40 |
| 2006/0127749 A1* | 6/2006 | Christie | B22F 7/002 427/126.3 |
| 2006/0286433 A1 | 12/2006 | Rakowski | 429/455 |
| 2007/0163889 A1* | 7/2007 | Kato | C25B 9/19 205/637 |
| 2007/0269701 A1 | 11/2007 | Larsen et al. | 429/33 |
| 2007/0275292 A1 | 11/2007 | Sin Xicola | 429/495 |
| 2008/0090127 A1 | 4/2008 | Gorte | 429/535 |
| 2009/0061279 A1 | 3/2009 | Larsen | 429/410 |
| 2010/0028757 A1 | 2/2010 | Fu et al. | 429/40 |
| 2010/0178589 A1 | 7/2010 | Kwon | 429/535 |
| 2012/0003565 A1 | 1/2012 | Son | 429/496 |
| 2012/0082920 A1 | 4/2012 | Mukerjee | 429/495 |
| 2012/0129039 A1 | 5/2012 | Drenckhahn | 429/223 |
| 2013/0157166 A1 | 6/2013 | Tsai | 429/48 |
| 2013/0224628 A1 | 8/2013 | Moon | 429/479 |
| 2014/0170529 A1 | 6/2014 | Jain | 252/518.1 |
| 2014/0170532 A1 | 6/2014 | Ohtani et al. | 429/534 |
| 2014/0242858 A1 | 8/2014 | Ochiai et al. | 440/88 M |
| 2014/0287342 A1 | 9/2014 | Jabbar et al. | 429/482 |
| 2015/0064596 A1 | 3/2015 | Leah | 429/465 |
| 2015/0194682 A1 | 7/2015 | Ashary | 429/465 |
| 2017/0273769 A1 | 9/2017 | Dengler | A61C 17/3472 |
| 2018/0019493 A1 | 1/2018 | Jakus | |
| 2018/0323443 A1 | 11/2018 | Tucker et al. | H01M 4/8882 |
| 2019/0081331 A1 | 3/2019 | Bauer | |
| 2019/0088969 A1 | 3/2019 | Koizumi et al. | H01M 8/1226 |
| 2019/0140287 A1 | 5/2019 | Liu et al. | H01M 4/9033 |
| 2019/0296385 A1 | 9/2019 | Sugihara | |
| 2022/0200033 A1 | 6/2022 | Seno et al. | H01M 8/1213 |

FOREIGN PATENT DOCUMENTS

| | | | | |
|---|---|---|---|---|
| CN | 107994234 A | 5/2018 | | |
| JP | H 04-075262 | 7/1990 | | |
| JP | H 07-249412 A | 9/1995 | | |
| JP | H 09-027330 A | 1/1997 | | |
| JP | 2004-512651 A | 4/2004 | | |
| JP | 2005535084 A | 11/2005 | | |
| JP | 2008502113 A | 1/2008 | | |
| JP | 2009541955 A | 11/2009 | | |
| JP | 2012033418 A | 2/2012 | | |
| JP | 2012-074307 A | 4/2012 | | |
| JP | 2012190746 A | 10/2012 | | |
| JP | 2013-012473 A | 1/2013 | | |
| JP | 2015153467 A | 4/2014 | | |
| JP | 2014163286 A | 9/2014 | | |
| JP | 2016039099 A | 3/2016 | | |
| JP | 2016115506 A | 6/2016 | | |
| JP | 2017033799 A | 2/2017 | | |
| JP | 2017525431 A | 9/2017 | | |
| JP | 2018-055946 A | 4/2018 | | |
| JP | 2020-087792 | * 11/2018 | | H01M 8/0232 |
| JP | 2019517098 A | 6/2019 | | |
| JP | WO 2019159276 A1 | 8/2019 | | |
| WO | WO 98/49738 A1 | 11/1998 | | |
| WO | WO 2014046196 A1 | 3/2014 | | |
| WO | WO 2018042476 A1 | 3/2018 | | |
| WO | WO 2020218431 A1 | 10/2020 | | |

OTHER PUBLICATIONS

Office Action issued on Oct. 19, 2023, in a counterpart Chinese Patent Application No. 202110245145.8.
A Notice of Reasons for Refusal issued by the Japanese Patent Office, mailed Dec. 6, 2022, for Japanese counterpart application No. 2018-222503. (3 pages).
A Notice of Reasons for Refusal issued by the Japanese Patent Office, mailed Sep. 6, 2022, for Japanese counterpart application No. 2018-222503. (5 pages).
Notice of Reasons for Refusal issued on Jan. 23, 2024 in a counterpart Japanese Patent Application No. 2020-040846.
Office Action issued on Dec. 20, 2023 in a related Chinese Patent Application No. 202010884982.0.
Jiang, San Ping, et al. "Electrical conductivity and performance of doped LaCrO3 perovskite oxides for solid oxide fuel cells." Journal of Power Sources 176.1 (2008): 82-89 (Year: 2008).
Teocoli, Francesca, et al. "Effects of co-sintering in self-standing CGO/YSZ and CGO/ScYSZ dense bi-layers." Journal of Materials Science 49 (2014): 5324-5333 (Year: 2014).
Notification of First Office Action dated Oct. 26, 2023, issued by the China National Intellectual Property Administration in corresponding application CN 202011030776.X.
Notice of Reasons for Refusal issued on Jul. 25, 2023 in related Japanese Patent Application No. 2019-184725.
Notice of Reasons for Refusal issued on May 9, 2023, in related Japanese Patent Application No. 2019-157789.
Gupta, Sapna, Manoj K. Mahapatra, and Prabhakar Singh. "Lanthanum chromite based perovskites for oxygen transport membrane." Materials Science and Engineering: R: Reports 90 (2015): 1-36 (Year: 2015).
Gao, Zhan, et al. "A perspective on low-temperature solid oxide fuel cells." Energy & Environmental Science 9.5 (2016): 1602-1644 (Year: 2016).
Fan, W., et al. "Improved properties of scandia and yttria co-doped zirconia as a potential thermal barrier material for high temperature applications." Journal of the European Ceramic Society 38.13 (2018): 4502-4511 (Year: 2018).
Fabbri, Emiliana, et al. "Electrode materials: a challenge for the exploitation of protonic solid oxide fuel cells." Science and technology of advanced materials (2010) (Year: 2010).
Ju, Young-Wan, et al. "New buffer layer material La (Pr) CrO3 for intermediate temperature solid oxide fuel cell using LaGaO3-based electrolyte film." Journal of Materials Research 27 (2012): 1906-1914 (Year: 2012).
Vert, Vicente B., et al. "Redox stability and electrochemical study of nickel doped chromites as anodes for H2/CH4-fueled solid oxide fuel cells." Applied Catalysis B: Environmental 115 (2012): 346-356. (Year: 2012).
Oh, Tae-Sik, et al. "Infiltrated lanthanum strontium chromite anodes for solid oxide fuel cells: Structural and catalytic aspects." Journal of Power Sources 262 (2014): 207-212 (Year: 2014).
Yan, Yan, et al. "Fabrication of reactive element oxide coatings on porous ferritic stainless steel for use in metal-supported solid oxide fuel cells." Surface and Coatings Technology 272 (2015): 415-427 (Year: 2015).
Huang, B., et al. "Characterization of a Cu—a0. 75Sr0. 25Cr0. 5Mn0. 5O3—CeO2/La0. 75Sr0. 25Cr0. 5Mn0. 5O3—YSZ/Ni—ScSZ three-layer structure anode in thin film solid oxide fuel cell running on methane fuel." Fuel Cells 15 (2015): 398-407. (Year: 2015).
Wasilewski, Eric, et al. "Cu/LaCrO3 joining by local melt infiltration through laser cladding." Journal of the American Ceramic Society 101 (2018): 4472-4479. (Year: 2018).
Final Office Action mailed Dec. 19, 2022, issued to U.S. Appl. No. 17/031,666.
Chinese Office Action issued on Jun. 24, 2024, in related Chinese Patent Application No. 202010884982.0.

(56) References Cited

OTHER PUBLICATIONS

"What is Spark Plasma Sintering" California Nanotechnologies—Intro to Spark Plasma Sintering, https:// www.calnanocorp.com/what-is-spark-plasma-sintering (Year: 2023).

* cited by examiner

SOLID OXIDE FUEL CELL AND MANUFACTURING METHOD OF THE SAME

CROSS-REFERENCE TO RELATED APPLICATION

This application is based upon and claims the benefit of priority of the prior Japanese Patent Application No. 2020-040846, filed on Mar. 10, 2020, the entire contents of which are incorporated herein by reference.

FIELD

A certain aspect of the present embodiments relates to a solid oxide fuel cell and a manufacturing method of the same.

BACKGROUND

Solid oxide fuel cells of which electrode bone structures of an anode and a cathode are made of ceramics are being developed (for example, see Japanese Patent Application Publication No. 2004-512651).

SUMMARY

There is a structure difference between an anode and a cathode. Therefore, a half cell other than the cathode may be fired. After that, the cathode may be printed and fired. However, in this case, it is difficult to obtain high adhesion between the half cell and the cathode. Therefore, the cathode may be peeled, and an ohmic resistance of whole of the fuel cell may get larger.

According to a first aspect of the present embodiments, there is provided a solid oxide fuel cell including: an anode that includes a porous layer including an electron conductive ceramics and an oxygen ion conductive ceramics, the porous layer of the anode being impregnated with an anode catalyst; an electrolyte layer that is provided on the anode and includes a solid oxide having oxygen ion conductivity; and a cathode that is provided on the electrolyte layer and has a porous layer including an electron conductive ceramics and an oxygen ion conductive ceramics, the pours layer of the cathode being impregnated with a cathode catalyst.

According to a second aspect of the present embodiments, there is provided a manufacturing method of a solid oxide fuel cell, the manufacturing method including: preparing a multilayer structure in which an anode green sheet, an electrolyte green sheet and a cathode green sheet are stacked, the anode green sheet including electron conductive ceramics powder and oxide ion conductive ceramics powder, the electrolyte green sheet including solid oxide powder having oxygen ion conductivity, the cathode green sheet including electron conductive ceramics powder and oxide ion conductive ceramics powder; and firing the multilayer structure.

DETAILED DESCRIPTION

Hereinafter, an embodiment will be described with reference to the accompanying drawings.

Figure 1:
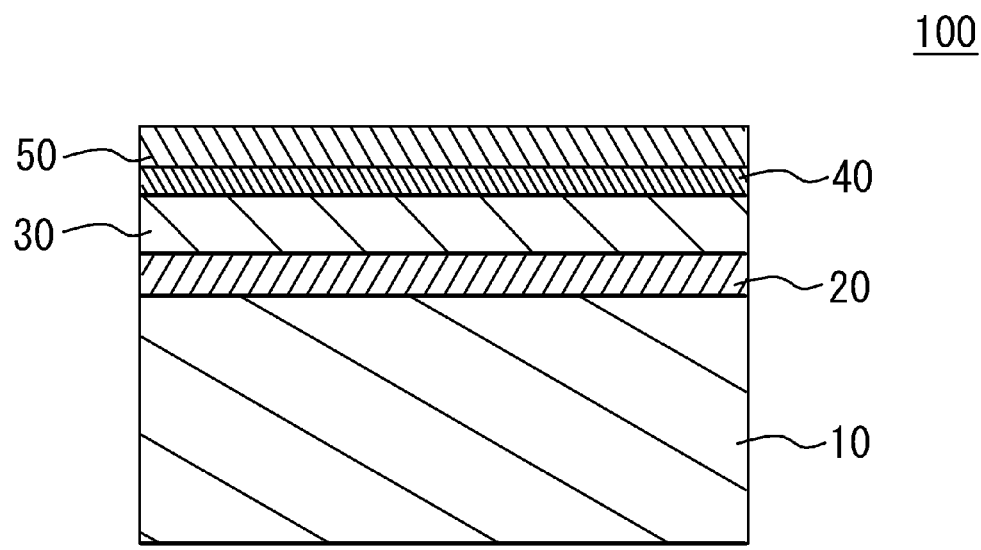
FIG. 1 is a schematic cross-sectional view of a multilayer structure of a solid oxide fuel cell.

FIG. 1 is a schematic cross-sectional view of a stacking structure of a solid oxide fuel cell 100. As illustrated in FIG. 1, the fuel cell 100 has, as an example, a structure in which a mixed layer 20, an anode 30, an electrolyte layer 40, and a cathode 50 are stacked on a support 10 in this order. A plurality of the fuel cells 100 may be stacked to structure a fuel cell stack.

The electrolyte layer 40 is a dense layer that is mainly composed of solid oxide having oxygen ion conductivity and has gas impermeability. The electrolyte layer 40 is preferably mainly composed of scandia yttria stabilized zirconium oxide (ScYSZ). The oxygen ion conductivity is the highest when the concentration of $Y_2O_3+Sc_2O_3$ is 6 mol % to 15 mol %. Thus, use of a material having this composition is preferable. The thickness of the electrolyte layer 40 is preferably 20 µm or less, further preferably 10 µm or less. The thinner electrolyte layer is better. However, to prevent gas at the upper face side and gas at the lower face side from leaking, the thickness is preferably 1 µm or greater.

Figure 2:
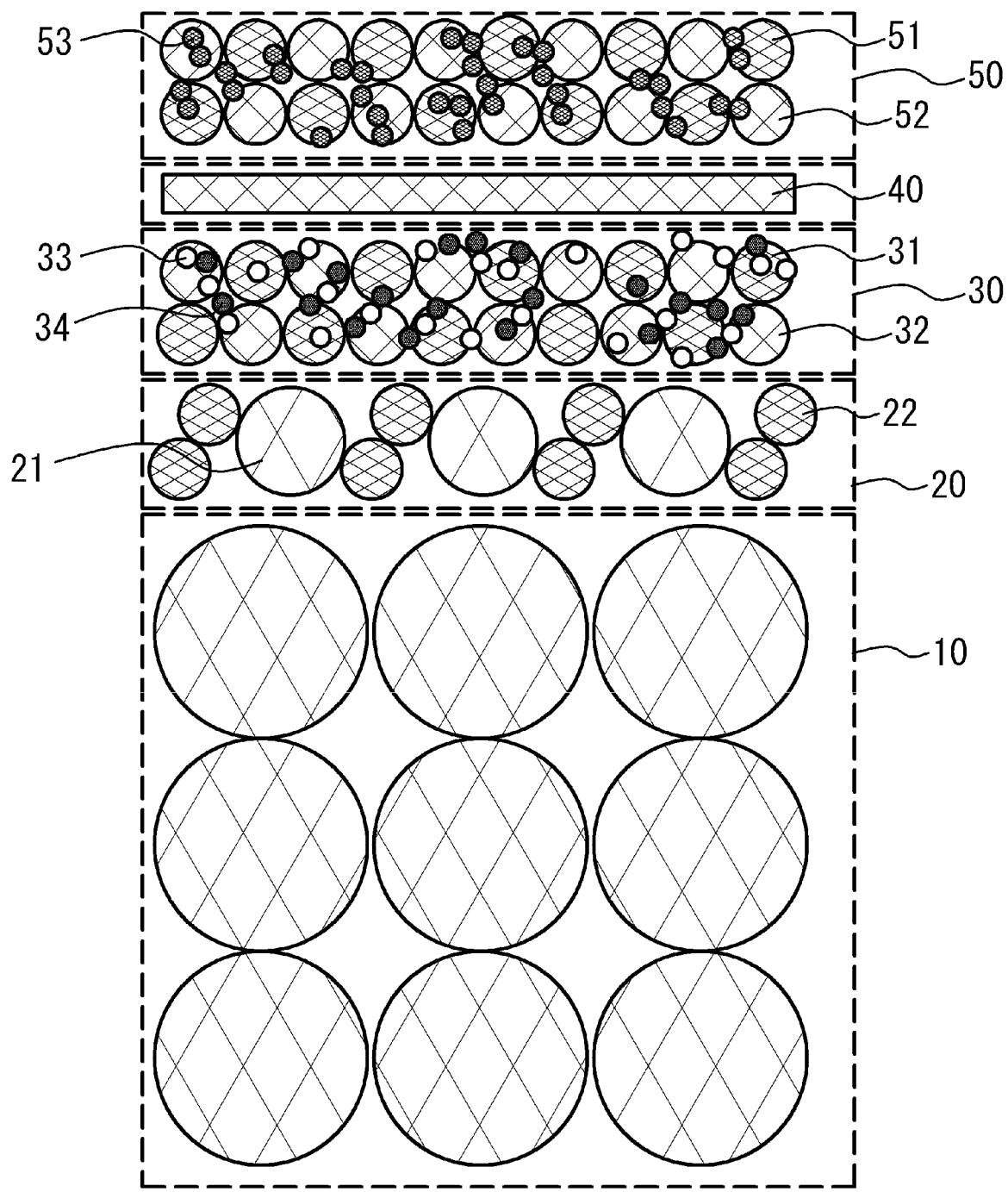
FIG. 2 is an enlarged cross-sectional view of details of a support, a mixed layer, an anode and a cathode.

FIG. 2 is an enlarged cross-sectional view illustrating details of the support 10, the mixed layer 20, the anode 30 and the cathode 50. The support 10 is a member that has gas permeability and is able to support the mixed layer 20, the anode 30, the electrolyte layer 40, and the cathode 50. The support 10 is a porous metallic material, and is, for example, a porous material of Fe—Cr alloys.

The anode 30 is an electrode having electrode activity as an anode, and has an electrode bone structure which is a porous layer and is made of a ceramics material. The electrode bone structure contains no metallic component. In this configuration, decrease in the porosity in the anode due to coarsening of a metallic component is inhibited during firing in a high-temperature reductive atmosphere. Additionally, alloying with a metallic component of the support 10 is inhibited, and deterioration of the catalyst function is inhibited.

The electrode bone structure of the anode 30 has electron conductivity and oxygen ion conductivity. The anode 30 contains an electron conductive ceramics 31. The electron conductive ceramics 31 can be a perovskite-type oxide expressed by the composition formula of $ABO_3$ where the A site is at least one selected from a group consisting of Ca, Sr, Ba, and La, and the B site includes at least one selected from a group consisting Ti and Cr. The mole fraction of the B site may be equal to or greater than the mole fraction of the A site (B≥A). More specifically, the electron conductive ceramics 31 can be a $LaCrO_3$-based material, a $SrTiO_3$-based material or the like.

The electrode bone structure of the anode 30 preferably contains an oxygen ion conductive ceramics 32. The oxygen ion conductive ceramics 32 is ScYSZ or the like. For example, it is preferable to use ScYSZ having the following composition range. Scandia ($Sc_2O_3$) is 5 mol % to 16 mol %, and yttria ($Y_2O_3$) is 1 mol % to 3 mol %. It is more preferable to use ScYSZ of which the total additive amount of scandia and yttria is 6 mol % to 15 mol %. This is because the highest oxygen ion conductivity is obtained in this composition range. The oxygen ion conductive ceramics 32 is, for example, a material with a transference number of oxygen ion of 99% or greater. GDC may be used as the oxygen ion conductive ceramics 32. In the example of FIG.

2, a solid oxide identical to the solid oxide contained in the electrolyte layer 40 is used as the oxygen ion conductive ceramics 32.

As illustrated in FIG. 2, in the anode 30, for example, the electron conductive ceramics 31 and the oxygen ion conductive ceramics 32 form the electrode bone structure. This electrode bone structure forms a plurality of pores. A catalyst is carried on the surface exposed to the pore of the electrode bone structure. Thus, in the spatially continuously formed electrode bone structure, a plurality of catalysts is spatially dispersed. A composite catalyst is preferably used as the anode catalyst. For example, an oxygen ion conductive ceramics 33 and a catalyst metal 34 are preferably carried, as a composite catalyst, on the surface of the electrode bone structure. The oxygen ion conductive ceramics 33 may be, for example, $BaCe_{1-x}Zr_xO_3$ doped with Y (BCZY, x=0 to 1), $SrCe_{1-x}Zr_xO_3$ doped with Y (SCZY, X=0 to 1), $LaScO_3$ doped with Sr (LSS), or GDC. Ni or the like may be used as the catalyst metal 34. The oxygen ion conductive ceramics 33 may have a composition identical to that of the oxygen ion conductive ceramics 32, or may have a composition different from that of the oxygen ion conductive ceramics 32. A metal acting as the catalyst metal 34 may be in a form of compound when electric power is not generated. For example, Ni may be in a form of a nickel oxide (NiO). These compounds are reduced with a reductive fuel gas supplied to the anode 30, and becomes in a form of metal acting as an anode catalyst.

The mixed layer 20 contains a metallic material 21 and a ceramics material 22. In the mixed layer 20, the metallic material 21 and the ceramics material 22 are randomly mixed. Thus, a structure in which a layer of the metallic material 21 and a layer of the ceramics material 22 are stacked is not formed. Also in the mixed layer 20, a plurality of pores is formed. The metallic material 21 is not particularly limited as long as the metallic material 21 is a metal. In the example of FIG. 2, a metallic material identical to the metallic material of the support 10 is used as the metallic material 21. The electron conductive ceramics 31 or the oxygen ion conductive ceramics 32 can be used as the ceramics material 22. For example, ScYSZ, GDC, a $SrTiO_3$-based material, or a $LaCrO_3$-based material can be used as the ceramics material 22. Since the $SrTiO_3$-based material and the $LaCrO_3$-based material have high electron conductivity, the ohmic resistance in the mixed layer 20 can be reduced.

The cathode 50 is an electrode having electrode activity as a cathode, and has an electrode bone structure which is a porous layer and is made of a ceramics material. The electrode bone structure contains no metallic component. The electrode bone structure of the cathode 50 has electron conductivity and oxygen ion conductivity. The cathode 50 contains an electron conductive ceramics 51. The electron conductive ceramics 51 can be a perovskite-type oxide expressed by the composition formula of $ABO_3$ where the A site is at least one selected from a group consisting of Ca, Sr, Ba, and La, and the B site includes at least one selected from a group consisting Ti and Cr. The mole fraction of the B site may be equal to or greater than the mole fraction of the A site (B≥A). More specifically, the electron conductive ceramics 51 can be a $LaCrO_3$-based material, a $SrTiO_3$-based material or the like. It is preferable that the electron conductive ceramics 51 includes the same component as the electron conductive ceramics 31. It is preferable that the electron conductive ceramics 51 has the same composition ratio as that of the electron conductive ceramics 31.

The electrode bone structure of the cathode 50 preferably contains an oxygen ion conductive ceramics 52. The oxygen ion conductive ceramics 52 is ScYSZ or the like. For example, it is preferable to use ScYSZ having the following composition range. Scandia ($Sc_2O_3$) is 5 mol % to 16 mol %, and yttria ($Y_2O_3$) is 1 mol % to 3 mol %. It is more preferable to use ScYSZ of which the total additive amount of scandia and yttria is 6 mol % to 15 mol %. This is because the highest oxygen ion conductivity is obtained in this composition range. The oxygen ion conductive ceramics 52 is, for example, a material with a transference number of oxygen ion of 99% or greater. GDC may be used as the oxygen ion conductive ceramics 52. It is preferable that the oxygen ion conductive ceramics 52 includes the same component as the oxygen ion conductive ceramics 32. It is preferable that the oxygen ion conductive ceramics 52 has the same composition ratio as that of the oxygen ion conductive ceramics 32. In the example of FIG. 2, a solid oxide identical to the solid oxide contained in the electrolyte layer 40 is used as the oxygen ion conductive ceramics 52.

As illustrated in FIG. 2, in the cathode 50, for example, the electron conductive ceramics 51 and the oxygen ion conductive ceramics 52 form the electrode bone structure. This electrode bone structure forms a plurality of pores. A cathode catalyst 53 is carried on the surface exposed to the pore of the electrode bone structure. Thus, in the spatially continuously formed electrode bone structure, a plurality of the cathode catalysts 53 are spatially dispersed. As the cathode catalyst 53, praseodymium oxide ($PrO_x$) or the like may be used.

The fuel cell 100 generates power by the following actions. An oxidant gas containing oxygen, such as air, is supplied to the cathode 50. At the cathode 50, oxygen reaching the cathode 50 reacts with electrons supplied from an external electric circuit to become oxygen ions. The oxygen ions conduct through the electrolyte layer 40 to move to the anode 30 side. On the other hand, a fuel gas containing hydrogen, such as a hydrogen gas or a reformed gas, is supplied to the support 10. The fuel gas reaches the anode 30 through the support 10 and the mixed layer 20. Hydrogen reaching the anode 30 release electrons at the anode 30 and reacts with oxygen ions conducting through the electrolyte layer 40 from the cathode 50 side to become water ($H_2O$). The released electrons are drawn out to the outside by the external electric circuit. The electrons drawn out to the outside are supplied to the cathode 50 after doing electric work. Through the above-described actions, electric power is generated.

In the above-described power generation reaction, the catalyst metal 34 acts as a catalyst in the reaction between hydrogen and oxygen ions. The electron conductive ceramics 31 conducts electrons obtained by the reaction between hydrogen and oxygen ions. The oxygen ion conductive ceramics 32 conducts oxygen ions reaching the anode 30 from the electrolyte layer 40. The cathode catalyst 53 acts as a catalyst in the reaction in which oxygen ions are generated from the oxygen gas and the electrons. The electron conductive ceramics 51 conducts the electrons from the external electric circuit. The oxygen ion conductive ceramics 52 conducts the oxygen ions to the electrolyte layer 40.

In the fuel cell 100 of the embodiment, both of the anode 30 and the cathode 50 have an electrode bone structure made of electron conductive ceramics and oxygen ion conductive ceramics. In the structures, the structure difference between the anode 30 and the cathode 50 is small. It is therefore possible to fire the anode 30 and the cathode 50 together with each other. Thus, the adhesion between the anode 30 and the cathode 50 is improved. Thereby, peeling is suppressed. And, the ohmic resistance of whole of the fuel cell 100 is reduced.

The fuel cell 100 of the embodiment has the support 10 of which the main component is a metal. Therefore, the fuel cell 100 has resistance against thermal shock, mechanical shock and so on. Since the mixed layer 20 contains the metallic material 21 and the ceramics material 22, the mixed layer 20 has material properties of metal and material properties of ceramic. Thus, the mixed layer 20 has high adhesiveness with the support 10 and high adhesiveness with the anode 30. Therefore, interlayer peeling between the support 10 and the anode 30 can be inhibited.

In the fuel cell 100, the oxygen ion conductive ceramics 33 is carried on the electrode bone structure of the anode 30. This structure allows to first form the electrode bone structure by firing, and then, impregnate the electrode bone structure with the oxygen ion conductive ceramics 33 and fire the electrode bone structure at a low temperature. Thus, even when the oxygen ion conductive ceramics 32 and the oxygen ion conductive ceramics 33 do not have the same composition, reaction between oxides is inhibited. Therefore, the degree of freedom to select, as the oxygen ion conductive ceramics 33, an oxide appropriate to the composite catalyst is increased.

In the fuel cell 100, the cathode catalyst 53 is carried on the electrode bone structure of the cathode 50. This structure allows to first form the electrode bone structure by firing, and then, impregnate the electrode bone structure with the cathode catalyst 53 and fire the electrode bone structure at a low temperature. Thus, even when the oxygen ion conductive ceramics 5 and the cathode catalyst 53 do not have the same composition, reaction between oxides is inhibited. Therefore, the degree of freedom to select, as the cathode catalyst 53, an oxide appropriate to the composite catalyst is increased.

In a case where $PrO_x$ is used as the cathode catalyst 53, when an average grain diameter of $PrO_x$ is large, a contact area between the cathode catalyst 53 and the cathode electrode bone structure is small. In this case, a reaction resistance may be large. And, characteristic of power generation may be degraded. And so, it is preferable that the average grain diameter of $PrO_x$ has an upper limit. In the embodiment, it is preferable that the average grain diameter of $PrO_x$ is 500 nm or less. It is more preferable that the average grain diameter is 300 nm or less. It is still more preferable that the average grain diameter is 100 nm or less. It is possible to calculate the average grain diameter of $PrO_x$ by measuring grain diameters of 50 numbers or more of $PrO_x$ grains from a cross section SEM image of the electrode and calculate an average of the grain diameters.

Figure 3:
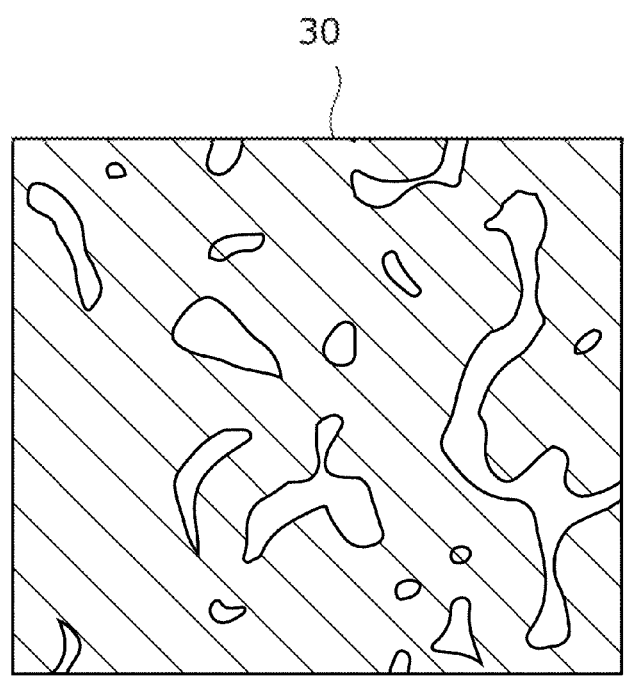
FIG. 3 is a schematic SEM image.

When the porosity of the electrode bone structure of the anode 30 and the porosity of the electrode bone structure of the cathode 50 are small, sufficient gas permeability may not be necessarily achieved. And so, it is preferable that the porosities of the electrode bone structure of the anode 30 and the electrode bone structure of the cathode 50 have a lower limit. In the embodiment, it is preferable that the porosities of the electrode bone structure of the anode 30 and the electrode bone structure of the cathode 50 are 20% or more. It is more preferable that the porosities are 30% or more. It is still more preferable that the porosities are 50% or more. It is possible to calculate the porosities by calculating an average value of ratios between estimated areas of pores and a whole area, from a sample cross section SEM image (for example, FIG. 3) of three or more points which are taken with a magnification so as to capture the whole of the thickness of the anode.

When the porosity is high in the electrode bone structure of the anode 30 and the electrode bone structure of the cathode 50, the number of the path of the electron conduction and the path of the ionic conduction are small. That is, the number of the reaction sites of the anode 30 and the cathode 50 may be small. And so, it is preferable that the porosities of the electrode bone structure of the anode 30 and the electrode bone structure of the cathode 50 have an upper limit. In the embodiment, it is preferable that the porosities are 80% or less. It is more preferable that the porosities are 70% or less. It is still more preferable that the porosities are 60% or less.

When the anode 30 and the cathode 50 are thin, the number of the three-phase interfaces contributing to the reaction may be small. And so, it is preferable that the thicknesses of the anode 30 and the cathode 50 have a lower limit. For example, it is preferable that the thicknesses of the anode 30 and the cathode 50 are 1 µm or more. It is more preferable that the thicknesses are 5 µm or more. It is still more preferable that the thicknesses are 10 µm or more.

On the other hand, the anode 30 and the cathode 50 are thick, an ohmic resistance of electrodes increases and characteristic of power generation may be degraded. And so, it is preferable that the thicknesses of the anode 30 and the cathode 50 have an upper limit. It is preferable that the thicknesses of the anode 30 and the cathode 50 are 50 µm or less. It is more preferable that the thicknesses are 30 µm or less. It is still more preferable that the thicknesses are 20 µm or less.

From a viewpoint of achieving favorable power generation characteristic of the fuel cell 100, it is preferable that the area of the electron conductive paths and the area of the ionic conductive paths are adequately balanced in the cross sections of the electrode bone structure of the anode 30 and the electrode bone structure of the cathode 50. For example, in the cross section of the electrode bone structure of the anode 30, it is preferable that a ratio of the cross section area of the electron conductive ceramics 31 and the cross section area of the oxygen ion conductive ceramics 32 is 1:3 to 3:1. In the cross section of the electrode bone structure of the cathode 50, it is preferable that a ratio of the cross section area of the electron conductive ceramics 51 and the cross section area of the oxygen ion conductive ceramics 52 is 1:3 to 3:1. It is possible to calculate the ratio of the cross section areas from the cross section of SEM-EDS.

Additionally, the porosity in the support 10, the porosity in the mixed layer 20, and the porosity in the anode 30 preferably have a relationship of the porosity in the support 10>the porosity in the mixed layer 20>the porosity in the anode 30. This relationship allows the support 10 to have sufficient gas permeability. Since the anode 30 has a comparatively low porosity, the anode 30 obtains high electron conductivity and high oxygen ion conductivity while maintaining gas permeability. The mixed layer 20 obtains gas permeability and the contact area with the support 10 is obtained. Thus, the mixed layer 20 obtains the adhesion with the support 10.

It is preferable that the electron conductive ceramics 31 and the electron conductive ceramics 51 are a perovskite-type oxide expressed by the composition formula of $ABO_3$ where the A site is at least one selected from a group consisting of Ca, Sr, Ba, and La, and the B site includes at least Cr. In this case, it is possible to stably fire the anode 30 and the cathode 50 in a strong reductive atmosphere.

In the embodiment, it is not necessary to provide a reaction prevention layer for preventing a reaction between the electrolyte layer 40 and the cathode 50, between the electrolyte layer 40 and the cathode 50. When the electrolyte layer 40 includes ScYSZ and the cathode 50 includes LSC, the reaction prevention layer prevents the following reaction.

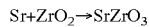

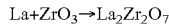

However, in the embodiment, the electron conductive ceramics 51 which is more stable than the LSC is used. Therefore, the reactions do not progress. Therefore, the reaction prevention layer is not necessary. And it is possible to reduce the ohmic resistance of the whole of the fuel cell 100.

Figure 4:
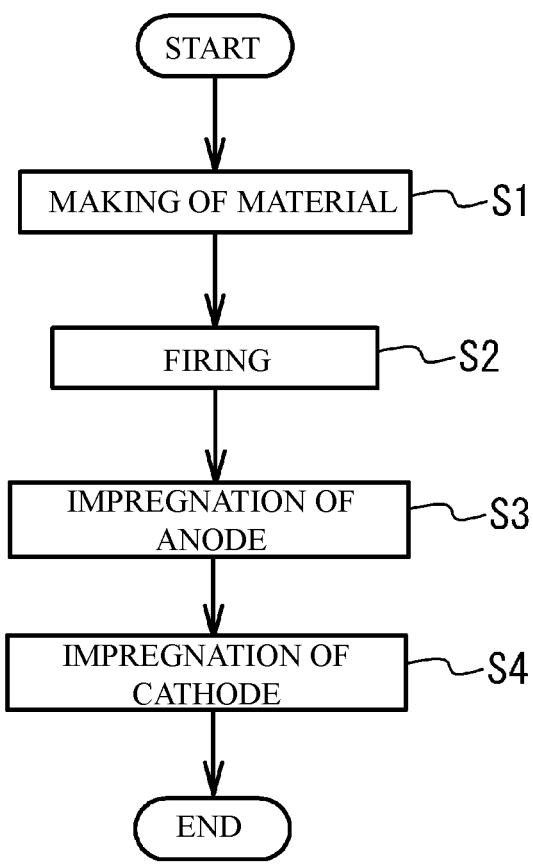
FIG. 4 is a flowchart of the manufacturing method of a fuel cell.

Hereinafter, a manufacturing method of the fuel cell 100 will be described. FIG. 4 is a flowchart of the manufacturing method of the fuel cell 100.

Making Process of Material for Support

Metallic powder having a particle size of, for example, 10 μm to 100 μm, a plasticizer, a solvent, a vanishing material, and a binder are mixed to make slurry as a material for support. The amount of the plasticizer is adjusted to, for example, 1 wt % to 6 wt % to adjust the adhesiveness of the sheet. The solvent is toluene, 2-propanol (IPA), 1-butanol, terpineol, butyl acetate, ethanol, or the like. The amount of the solvent is 20 wt % to 30 wt % depending on the viscosity or the like. The vanishing material is an organic substance. The binder is PVB, acrylic resin, ethyl cellulose, or the like. The material for support is used as a material for forming the support 10. The ratio of the volume of the organic components (the vanishing material, the solid component of the binder, and the plasticizer) to the volume of the metallic powder is within a range of, for example, 1:1 to 20:1. The amount of the organic components is adjusted depending on the porosity.

Making Process of Material for Mixed Layer

Ceramics material powder, which is the raw material of the ceramics material 22, metallic material powder having a small particle size, which is the raw material of the metallic material 21, a solvent, a plasticizer, and a binder are mixed to make slurry as a material for mixed layer. The ceramics material powder has a particle size of, for example, 100 nm to 10 μm. The metallic material powder has a particle size of, for example, 1 μm to 10 μm. The solvent is toluene, 2-propanol (IPA), terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The vanishing material is an organic substance. The binder is PVB, acrylic resin, ethyl cellulose, or the like. The ratio of the volume of the organic components (the vanishing material, the solid component of the binder, and the plasticizer) to the volume of the ceramics material powder and the metallic material powder is within a range of, for example, 1:1 to 5:1. The amount of the organic components is adjusted depending on the porosity. The diameter of the pore is controlled by adjusting the particle size of the vanishing material. The ceramics material powder may contain powder of an electron conductive material and powder of an oxygen ion conductive material. In this case, the ratio of the volume of the powder of the electron conductive material to the volume of the powder of the oxide-ion conductive material is preferably within a range of, for example, 1:9 to 9:1. Use of an electrolyte material such as ScYSZ, GDC, or the like instead of the electron conductive material also prevents the peeling of the boundary face and enables the manufacture of the cell. However, to reduce the ohmic resistance, it is preferable to mix an electron conductive material and metallic powder.

Making Process of Material for Anode

Ceramics material powder structuring the electrode bone structure, a solvent, a plasticizer, a vanishing material, and a binder are mixed to make slurry as a material for anode. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to, for example, 1 wt % to 6 wt % to adjust the adhesiveness of the sheet. The vanishing material is an organic substance. The binder is PVB, acrylic resin, ethyl cellulose, or the like. Powder of the electron conductive material that is the raw material of the electron conductive ceramics 31 and has a particle size of, for example, 100 nm to 10 μm and powder of the oxygen ion conductive material that is the raw material of the oxygen ion conductive ceramics 32 and has a particle size of, for example, 100 nm to 10 μm may be used as the ceramics material powder structuring the electrode bone structure. The ratio of the volume of the organic components (the vanishing material, the solid component of the binder, and the plasticizer) to the volume of the powder of the electron conductive material is within a range of, for example, 1:1 to 5:1, and the amount of the organic components is adjusted depending on the porosity. Additionally, the diameter of the pore is controlled by adjusting the particle size of the vanishing material. The ratio of the volume of the powder of the electron conductive material to the volume of the powder of the oxygen ion conductive material is within a range of, for example, 3:7 to 7:3.

Making Process of Material for Cathode

Ceramics material powder structuring the electrode bone structure, a solvent, a plasticizer, a vanishing material, and a binder are mixed to make slurry as a material for cathode. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to, for example, 1 wt % to 6 wt % to adjust the adhesiveness of the sheet. The vanishing material is an organic substance. The binder is PVB, acrylic resin, ethyl cellulose, or the like. Powder of the electron conductive material that is the raw material of the electron conductive ceramics 51 and has a particle size of, for example, 100 nm to 10 μm and powder of the oxygen ion conductive material that is the raw material of the oxygen ion conductive ceramics 52 and has a particle size of, for example, 100 nm to 10 μm may be used as the ceramics material powder structuring the electrode bone structure. The ratio of the volume of the organic components (the vanishing material, the solid component of the binder, and the plasticizer) to the volume of the powder of the electron conductive material is within a range of, for example, 1:1 to 5:1, and the amount of the organic components is adjusted depending on the porosity. Additionally, the diameter of the pore is controlled by adjusting the particle size of the vanishing material. The ratio of the volume of the powder of the electron conductive material to the volume of the powder of the oxygen ion conductive material is within a range of, for example, 3:7 to 7:3. When the material for cathode is the same as the material for anode, the material for anode may be used as the material for cathode.

Making Process of Material for Electrolyte Layer

Powder of an oxygen-ion conductive material, a solvent, a plasticizer, and a binder are mixed to make slurry as a material for electrolyte layer. The powder of the oxygen-ion conductive material is, for example, ScYSZ, YSZ, GDC, or the like, and has a particle size of 10 nm to 1000 nm. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The binder is PVB, acrylic resin, ethyl cellulose, or the like. The ratio of the volume of the organic components (the solid component of the binder and the plasticizer) to the volume of the powder of the oxygen ion conductive material is within a range of, for example, 6:4 to 3:4.

Firing Process

A support green sheet is made by applying the material for support on a polyethylene terephthalate (PET) film. A mixed layer green sheet is made by applying the material for mixed layer on another PET film. An anode green sheet is made by applying the material for anode on yet another PET film. An electrolyte layer green sheet is made by applying the material for electrolyte layer on yet another PET film. A cathode green sheet is made by applying the material for cathode on yet another PET film. For example, several support green sheets, one mixed layer green sheet, one anode green sheet, one electrolyte layer green sheet and one cathode green sheet are stacked in this order, cut into a predetermined size, and fired within a temperature range of approximately 1100° C. to 1300° C. in a reductive atmosphere with an oxygen partial pressure of 10-16 atm or less. Through the above process, a cell including the support 10, the mixed layer 20, the electrode bone structure of the anode 30, the electrolyte layer 40, and the electrode bone structure of the cathode 50 is obtained. The reductive gas flown into the furnace may be a gas in which $H_2$ (hydrogen) is diluted with non-flammable gas (Ar (argon), He (helium), $N_2$ (nitrogen) or the like). 100% of the reductive gas may be $H_2$. From a view point of safety such as explosion limit, it is preferable that the concentration of $H_2$ has an upper limit. For example, it is preferable that the concentration of $H_2$ is 4 volume % or less, when the reductive atmosphere is a mixed gas of $H_2$ and Ar.

Impregnating Process of Anode

Next, the electrode bone structure of the anode 30 is impregnated with the raw materials of the oxygen ion conductive ceramics 33 and the catalyst metal 34. For example, the following process is repeated as many times as needed such that Gd-doped ceria or Sc, Y-doped zirconia and Ni are generated when the cell is fired in a reductive atmosphere at a predetermined temperature. Nitrate or chloride of Zr, Y, Sc, Ce, Gd, or Ni is dissolved in water or alcohol (ethanol, 2-propanol, methanol or the like). The cell is impregnated with the resulting solution, and dried. The resulting cell is subjected to heat treatment.

Impregnating Process of Cathode

Next, the electrode bone structure of the cathode 50 is impregnated with the cathode catalyst 53 such as $PrO_x$. For example, the following process is repeated as many times as needed. Nitrate or chloride of Pr is dissolved in water or alcohol (ethanol, 2-propanol, methanol or the like). The cell is impregnated with the resulting solution, and dried. The resulting cell is subjected to heat treatment. With the above-mentioned processes, the fuel cell 100 is made.

In the manufacturing method of the embodiment, when the anode 30 and the cathode 50 are fired, the structure difference between the electrode bone structure of the anode 30 and the electrode bone structure of the cathode 50 is small because the anode 30 and the cathode 50 are formed from the electron conductive material and the oxygen ion conductive material. It is therefore possible to fire the anode 30 and the cathode 50 together with each other. This results in improving of the adhesion between the anode 30 and the electrolyte layer 40 and the adhesion between the cathode 50 and the electrolyte layer 40. And, the peeling of the anode 30 and the peeling of the cathode 50 are suppressed. Thereby, the ohmic resistance of the whole of the fuel cell 100 is reduced.

Since the material for mixed layer contains the metallic material powder and the ceramics material powder, the mixed layer 20 after the firing includes the metallic material 21 and the ceramics material 22. Therefore, the mixed layer 20 has material properties of the metallic material 21 and the ceramics material 22. Therefore, interlayer peeling between the support 10 and the anode 30 can be inhibited.

Additionally, the amount of the vanishing material in the material for support, the amount of the vanishing material in the material for mixed layer, the amount of the vanishing material in the material for anode are preferably adjusted such that the porosity in the support 10, the porosity in the mixed layer 20, and the porosity in the anode 30 have a relationship of the porosity in the support 10>the porosity in the mixed layer 20>the porosity in the anode 30. This relationship allows the support 10 to have sufficient gas permeability. The anode 30 becomes dense, and obtains high oxygen ion conductivity. The mixed layer 20 obtains gas permeability, and also obtains the contact area with the support 10, thereby obtaining adhesion with the support 10.

In the manufacturing method of the embodiment, the electrode bone structures are fired of the anode 30 and the cathode 50. After that, the electrode bone structures are impregnated with a complex catalyst. It is possible to fire the complex catalyst at a low temperature (for example, 850 degrees C. or less). Therefore, the reaction between the electrode bone structure of the anode 30 and the anode catalyst is suppressed. And, the reaction between the electrode bone structure of the cathode 50 and the cathode catalyst is suppressed. Therefore, the degree of freedom to select the anode catalyst and the cathode catalyst is increased.

EXAMPLES

The fuel cell 100 was fabricated according to the manufacturing method in accordance with the above embodiment.

Example 1

SUS (stainless) powder was used as the material for support. ScYSZ was used as the electrolyte layer. A $LaCrO_3$-based material was used for the electron conductive ceramics of the anode, and ScYSZ was used for oxygen ion conductive ceramics of the anode. A $LaCrO_3$-based material was used for the electron conductive ceramics of the cathode, and ScYSZ was used for oxygen ion conductive ceramics of the cathode. A $LaCrO_3$-based material was used for the ceramics material of the mixed layer. Stainless steel (SUS) was used for the metallic material of the mixed layer. The mixed layer green sheet, the anode green sheet, the electrolyte layer green sheet and the cathode green sheet were stacked on the support green sheet in this order. The resulting cell was cut into a predetermined size. The resulting cell was fired under a reductive atmosphere with an oxygen partial pressure of 10-16 atm or less. Additionally, the resulting electrode bone structure of the anode was impregnated with GDC and Ni, and was then fired under an air atmosphere at a temperature of 850° C. or less. Additionally, the resulting electrode bone structure of the cathode was impregnated with nitrate of Pr, and was then fired under an air atmosphere at a temperature of 700° C. or less. Thus, $PrO_x$ was supplied as the cathode catalyst. The average grain diameter of $PrO_x$ after the firing was 100 nm. The porosities of the electrode bone structures of the anode and the cathode were 50%. The thicknesses of the anode and the cathode were 10 μm. In the electrode bone structures of the anode and the cathode, a cross section area ratio of the electron conductive ceramics and the oxygen ion conductive ceramics was 1:1.

Example 2

A $LaTiO_3$-based material was used for the electron conductive ceramics of the anode and the electron conductive ceramics of the cathode. Other conditions were the same as those of the example 1. The average grain diameter of $PrO_x$ after the firing was 100 nm. The porosities of the electrode bone structures of the anode and the cathode were 50%. The thicknesses of the anode and the cathode were 10 μm. In the electrode bone structures of the anode and the cathode, a cross section area ratio of the electron conductive ceramics and the oxygen ion conductive ceramics was 1:1.

Comparative Example 1

The support green sheet, the mixed layer green sheet and the anode green sheet that were the same as those of the example 1 were used. The mixed layer green sheet, the anode green sheet and the electrolyte green sheet were stacked on the support green sheet. The resulting half-cell was cut into a predetermined size. The resulting half-cell was fired in the reductive atmosphere of which the oxygen partial pressure was 10-16 atm or less. The electrode bone structure of the anode was impregnated with GDC and Ni. The anode catalyst was fired in an air atmosphere at a temperature of 850° C. or less. A film of $Ce_{0.8}Gd_{0.2}O_{2-x}$ acting as a reaction prevention layer was formed on the electrolyte layer. After that, $La_{0.8}Sr_{0.2}CoO_3$ was printed on the reaction prevention layer, and was fired in an air atmosphere at a temperature of 800° C.

Comparative Example 2

$Pr_6O_{11}$ was used for the cathode. The cathode catalyst was not used after firing the cathode. Other conditions were the same as those of the example 1. The average grain diameter of $PrO_x$ after the firing was 500 nm. The porosities of the electrode bone structures of the anode and the cathode were 50%. The thicknesses of the anode and the cathode were 5 μm. In the electrode bone structures of the anode, a cross section area ratio of the electron conductive ceramics and the oxygen ion conductive ceramics was 1:1.

Evaluation of Electrical Power Generation

Impedance of each of the fuel cells of the examples 1 and 2 and the comparative examples 1 and 2 was measured to separate the resistance value to measure the ohmic resistance of the fuel cell as a whole and the reaction resistance of the cathode. Table shows the results.

TABLE 1

| | CATHODE | REACTION PREVENTION LAYER | SUPPORT | OHMIC RESISTANCE ($\Omega \cdot cm^2$) | CATHODE REACTION RESISTANCE ($\Omega \cdot cm^2$) |
|---|---|---|---|---|---|
| EXAMPLE 1 | $LaCrO_3/ScYSZ/PrO_x$ | — | METAL | 0.25 | 0.27 |
| EXAMPLE 2 | $LaTiO_3/ScYSZ/PrO_x$ | — | METAL | 0.25 | 0.27 |
| COMPARATIVE EXAMPLE 1 | $LaSrCoO_3$ | GDC | METAL | 0.43 | 1.23 |
| COMPARATIVE EXAMPLE 2 | PrOx | — | METAL | 2.3 | 5.1 |

In the example 1, the ohmic resistance was 0.25 $\Omega \cdot cm^2$. In the example 2, the ohmic resistance was 0.25 $\Omega \cdot cm^2$. In this manner, the ohmic resistance was low in the examples 1 and 2. It is thought that this was because both of the anode and the cathode had the electrode bone structure including the electron conductive ceramics and the oxygen ion conductive ceramics, and the anode and the cathode could be fired together with each other, and layer peeling or the like was suppressed.

In the example 1, the reaction resistance of the cathode was 0.27 $\Omega \cdot cm^2$. In the example 2, the reaction resistance of the cathode was 0.27 $\Omega \cdot cm^2$. In this manner, the reaction resistance of the cathode was low in the examples 1 and 2. It is thought that this was because the peeling of the cathode or the like was suppressed.

On the other hand, in the comparative example 1, the ohmic resistance was 0.43 $\Omega \cdot cm^2$. The reaction of the cathode was 1.23 $\Omega \cdot cm^2$. In this manner, the ohmic resistance and the reaction resistance were high in the comparative example 1. And so, the surface of the cell after generating the electric power was observed with use of an optical microscope. Crack was observed on the surface of the cathode. Peeling of a large area was observed. A part below the peeled cathode was observed. The electrolyte having gloss was observed. The adhesion between the cathode and the electrolyte was not good. Moreover, the cross section was observed with use of SEM. A part of the interface between the cathode and the electrolyte layer was peeled. It is thought that the firing temperature of the cathode was low, the adhesiveness between the cathode and the electrolyte layer was bad, and the interlayer peeling occurred after generating the electrical power. The ohmic resistance and the reaction resistance increased because of the interlayer peeling.

In the comparative example 2, the ohmic resistance was 2.3 $\Omega \cdot cm^2$. The reaction resistance of the cathode was 5.1 $\Omega \cdot cm^2$. In this manner, the ohmic resistance and the reaction resistance largely increased in the comparative example 2. The cross section of the cell after generating the electrical power was observed with use of the SEM. The $PrO_x$ material did not react with the electrolyte layer. However, the electron conductivity and the ionic conductivity of the $PrO_x$ material are low. When only the $PrO_x$ material is used, the electron conduction path and the ion conduction path are not sufficiently formed. Therefore, it is thought that the ohmic resistance and the reaction resistance were large.

Although the embodiments of the present invention have been described in detail, the present invention is not limited to such a specific embodiment, and it is to be understood that the various change, substitutions, and alterations could be made hereto without departing from the spirit and scope of the invention.

What is claimed is:

1. A solid oxide fuel cell comprising:
    an anode that includes a porous layer including an electron conductive ceramics and an oxygen ion conductive ceramics, the porous layer of the anode being impregnated with an anode catalyst;
    an electrolyte layer that is provided on the anode and includes a solid oxide having oxygen ion conductivity; and
    a cathode that is provided on the electrolyte layer, the cathode comprises an electrode bone structure formed from an electron conductive ceramics and an oxygen ion conductive ceramics without Pr metal, wherein the electrode bone structure comprises a plurality of pores, and wherein the cathode catalyst is carried on a surface of the electrode bone structure exposed to the plurality of pores
    wherein the cathode catalyst is Pr oxide consisting of Pr and O,
    wherein the electron conductive ceramics of the anode is $LaTiO_3$,
    wherein the oxygen ion conductive ceramics of the anode is ScYSZ,
    wherein the electron conductive ceramics of the cathode is $LaTiO_3$,
    wherein the oxygen ion conductive ceramics of the cathode is $ScYSZ_1$ wherein the electrode bone structure is spatially continuous.

2. The solid oxide fuel cell as claimed in claim 1 wherein an average grain diameter of the Pr oxide is 100 nm or less.

3. The solid oxide fuel cell as claimed in claim 1, wherein porosities of the porous layer of the anode and the porous layer of the cathode are 20% or more.

4. The solid oxide fuel cell as claimed in claim 1, wherein thicknesses of the anode and the cathode are 1 μm or more.

5. The solid oxide fuel cell as claimed in claim 1, wherein a cross section area ratio of the electron conductive ceramics and the oxygen ion conductive ceramics in the porous layers of the anode and the cathode is 1:3 to 3:1.

6. The solid oxide fuel cell as claimed in claim 1, wherein the electron conductive ceramics of the porous layer of the anode and the electron conductive ceramics of the porous layer of the cathode are a perovskite-type oxide expressed by a composition formula of $ABO_3$ where an A site is at least one selected from a group consisting of Ca, Sr, Ba, and La, and a B site includes at least Cr.

7. The solid oxide fuel cell as claimed in claim 1,
    further comprising a support of which a main component is a metal,
    wherein the anode is provided on the support.

8. The solid oxide fuel cell as claimed in claim 7,
    further comprising a mixed layer between the support and the anode,
    wherein the mixed layer has a structure in which a metallic material and a ceramics material are mixed with each other.

* * * * *